S. HUNTER.
ROUTING MACHINE.
APPLICATION FILED JAN. 9, 1913.

1,083,212.

Patented Dec. 30, 1913.

Witnesses
L. B. James
N. S. Collamer

Inventor
Samuel Hunter
By H. B. Willson & Co.
Attorneys

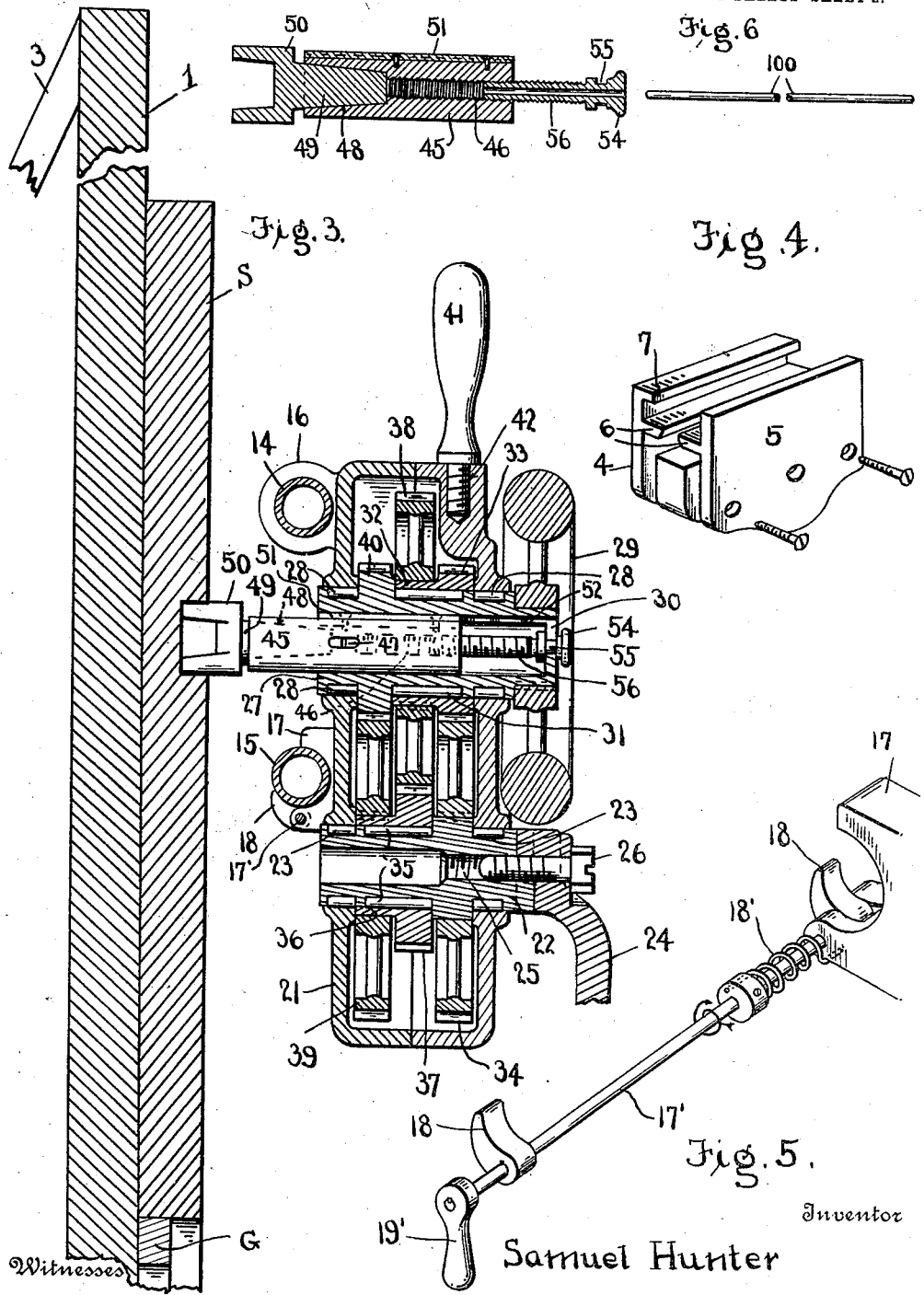

UNITED STATES PATENT OFFICE.

SAMUEL HUNTER, OF BELLEVUE, PENNSYLVANIA.

ROUTING-MACHINE.

1,083,212.   Specification of Letters Patent.   Patented Dec. 30, 1913.

Application filed January 9, 1913. Serial No. 741,016.

*To all whom it may concern:*

Be it known that I, SAMUEL HUNTER, a citizen of the United States, residing at Bellevue, in the county of Allegheny and State of Pennsylvania, have invented certain new and useful Improvements in Routing-Machines; and I do declare the following to be a full, clear, and exact description of the invention, such as will enable others skilled in the art to which it appertains to make and use the same.

This invention relates to wood working, and more especially to gaining; and the object of the same is to produce a cheap, light and reliable hand-operated machine for cutting grooves in the face of a board, and useful for routing out stair horses for the treads and risers or for gaining out the grooves in certain members of a window- or door-frame, or for other purposes. The preferred construction of machine for carrying out this purpose is set forth in the following specification and claims, and shown in the attached drawings wherein—

Figure 1 is a front elevation of this machine with the fly wheel in dotted lines. Fig. 2 is a section through one of the clamps and the devices carried thereby. Fig. 3 is a section on the line 3—3 of Fig. 1, on an enlarged scale. Fig. 4 is a perspective detail of one of the clamps, and Fig. 5 is an enlarged perspective detail showing both of the spring-actuated latches. Fig. 6 is a sectional view through the stock and the adjusting screw therefor which in its preferred form is made tubular for a purpose to appear below.

In the use of this machine, I preferably employ a long and rather thick plank 1 forming the bed by which it is supported in an upright position, and this plank has a groove 2 in its face and may rest flat upon the work bench although I preferably stand it on edge and brace it in position as shown at 3 in the drawings. Engaging the upper and lower edges of said plank are duplicate clamps, each comprising members 4 and 5 having shoulders 6 engaging the edge of the plank and the front member 4 also having a rib 7 moving in said groove 2. The members are connected by a bolt 8 or otherwise, and on the front member of each clamp is mounted a block 9 which is by preference metal-faced as at 10. Mounted over the facing around the bolt is a disk 11 having two eyes 12 at opposite sides, and a thumb nut 13 engaging said bolt holds the disk in any position to which it is set. The eyes of the two clamps are connected by guide rods 14 and 15 which may well be pieces of tubing held in the eyes of the lower clamp by nuts 15′ and sliding through the eyes of the upper clamp. In the drawings I have shown the two clamps so attached to the opposite edges of the upright plank that the guide rods stand at an angle of 45° to the length of said plank, and this is the position the same will assume when the machine is used for cutting grooves in stair horses S. However, it will be obvious that by loosening the thumb nuts 13 the two clamps may be adjusted along the edges of said plank so that the guide rods can be set across the same at any desired angle, as for instance at right angles to its length as when grooves are to be cut across the stock at right angles to the length of the same. Movably mounted on these guides is a carriage having at one side two eyes 16 slidably and revolubly engaging the guide 14 and at the other side two forks 17 adapted to rest over the opposite guide 15, and 17′ is a rod journaled through the fork-arms and carrying a latch 18 within each fork adapted to engage under this guide when the carriage is turned down onto the pair of guides. The rod is turned by a spring 18′ to normally raise the latches 18 and has a thumb-piece 19′ by means of which it can be turned manually in the other direction. I may here say that for the purpose of changing the auger or bit as when a different width or depth of groove is to be cut, the spring latches are swung out of engagement with the guide 15 and this edge of the carriage raised, turning as a pivot around its guide 14; and after the new bit or auger has been put in place the carriage is restored to its working position.

The numeral 19 designates a stop set up on one of the guides by means of a set screw 20, and this limits the descent of the carriage for a purpose to appear below. This carriage comprises a box-shaped casing 21, separately formed in two members detachably connected with each other in any suitable manner and containing a mechanism which I will now describe.

A tubular driving spindle 22 is journaled in roller bearings 23 in one end of the casing, and a crank handle 24 is connected with the threaded bore 25 of said spindle by means of a screw 26 or in any suitable manner so as to render it detachable. A tubular driven spindle 27 is journaled in roller bearings 28 in the other end of the casing, its front end projecting beyond the latter and carrying a fly wheel 29 fixed thereon and rotating under the crank handle as seen; and this end of this spindle preferably has a key-hole slot 30 in its otherwise closed extremity, for a purpose to appear. Mounted on roller bearings 31 around the spindle 27 is a sleeve 32 having teeth 33 engaged by those on a rather large driving gear wheel 34 which is fast on the driving spindle 22. Mounted on roller bearings 35 around the driving spindle 22 is a second sleeve 36 having teeth 37 meshing with those in a counter gear wheel 38 which is fast on the sleeve 32. Fast on the second sleeve 36 is a gear wheel 39 which meshes with teeth 40 formed on the driven spindle 27 below the first sleeve 32 mounted thereon. It follows from this construction that the crank handle rotates the driving spindle, the driving gear wheel 34 fast thereon rotates the sleeve 32, the gear wheel 38 fast on this sleeve rotates the second sleeve 36, and the gear wheel 39 fast on this sleeve rotates the tubular driven spindle 27; and as each of the three gear wheels is larger than the size of the toothed member which it drives, one revolution of the driving spindle by means of the crank handle will impart several revolutions to the driven spindle which is to carry the cutting tool. Attention is directed to the fact that this train of gears, while greatly multiplying the speed of rotation through members which are all mounted on roller bearings, is entirely inclosed within a casing that excludes all dirt and sawdust, is readily accessible when the parts of the casing are separated, and yet is very small, compact and effective. The eyes 16 and forks 17 are so located on the casing 21 that the entire carriage is disposed above or in front of the two guides and the driven spindle 27 stands midway between them, and this carriage may be raised or lowered along said guides by means of a handle 41 removably engaging a threaded socket 42 in the casing.

Slidably mounted within the bore of the tubular driven spindle 27 is the stock 45 which has a threaded socket 46 in its upper end, possibly also a slot 47 cut transversely through its body at about the center of the length of the same for a purpose to appear below, and a tapering socket 48 in its lower end for the reception of the shank 49 of the bit or tool 50 which is to do the cutting, said shank being driven into the socket 48 in the usual manner and removed therefrom by inserting a wedge or a suitable tool through the slot 47 beyond the end of the shank 49 in a manner well understood to those familiar with these instruments. Attached to one side of the stock 45 is a key 51 engaging a key-way or groove 52 that extends along one side of the bore of the driven spindle 27, and this construction permits the stock to be moved longitudinally within said bore or to be withdrawn therefrom, but causes the stock to rotate with the spindle in either direction that the latter is turned by the mechanism above described. Therefore it is possible to rotate the bit either to the right or to the left, and to feed the bit forward and retract it without interrupting the rotary movement.

Engaging the threaded socket 46 in the upper end of the stock 45 is a preferably hollow screw 56 having a groove 55 around its shank beneath its head 54, which latter is milled or knurled so that it may be turned by the thumb and finger of the operator. The groove 55 is intended to engage the inner or smaller end of the key hole slot 30 in the top or head of the driven spindle 27, which smaller end is therefore disposed over the axis of the bore of the spindle; and obviously when the head 54 is turned in the proper direction the stock 45 with its bit 50 will be adjusted either toward the work F or from it. To remove the stock entirely, the screw is turned until it disengages the threaded socket 46 when the stock will fall out the lower end of the driven spindle and the screw may be moved into the large end of the key-hole slot 30 and then drawn out the top of the spindle in a manner which will be clear. Any suitable tool such as an ordinary screw driver may then be put through the slot 47 behind the inner end of the bit 50 and the latter forced out of the stock so that a new tool can be put in place, and the parts restored.

In use the stringer or stair-horse S to be worked upon is laid against the face of the plank 1 and preferably moved over a bead G screwed or nailed thereto as seen, and after one groove is cut in the string it is moved along for one step so as to cut the next groove which stands at the same angle to its length. The operator stands in front of the bench and the plank, and manipulates the crank handle 24 with one hand while he raises and lowers the carriage on its guides with the other hand, the stop 19 on the guide 14 being set to limit the descent of the carriage and hence define the lower end of the groove being cut in the stock.

It will be obvious without further illustration and explanation that the guides may be set at any desired angle across the plank and hence across the stringer or work being operated upon; and that the width of the groove is determined by the shape of the cutter head or bit and the depth of the groove is determined by the distance to which the stock and bit are screwed into or out from the inner end of the driven spindle. I prefer that the plank and the work shall stand on edge as described, in order that the material cut out of the work shall fall away of its own accord and in order that the operator shall have a better opportunity to grasp the handles and manipulate the machine; however, it is possible to lay the plank and the work flat upon the work bench, or in fact to dispose them in any position desired. I do not limit myself to the precise details of construction hereinbefore described, as changes therein may be made so long as the spirit of the invention is retained. Nor do I limit myself to the proportions and materials of parts. Having ascertained the correct angle to the string S and set the parts as seen in Fig. 1, the screw 56 is turned by its threads 54 to project the stock 45 and the bit 50 to the required degree, the machine at this time being raised to its full limit along the guides 14 and 15 so that the bit stands above the upper edge of the stringer S. Grasping the handle 41 with his left hand and the crank handle 24 with his right hand, the operator now rotates said crank handle slowly, and, through the various gears, this causes the rapid revolution of the bit; and meanwhile he permits the machine to slide downward along the guides so that the rapidly rotating bit cuts a shallow groove in the face of the stringer S. When the lowermost eye 16 strikes the stop 19 which has been set to the proper point, the operator returns the machine to its highest position, advances the screw 56 and the bit a little farther, and repeats the operation so as to cut the same groove deeper; and this action is repeated until the groove is cut as deep as necessary. Or he may prefer to cut all the grooves in the stair-horse to one depth before advancing the stock and the bit to deepen them, and then cut all of them deeper before again advancing it, and so on. In either event, finally he cuts all of the grooves which are to receive the risers in the illustration shown in Fig. 1, after which he retracts the screw 56 to raise the bit 50 out of the groove, and then he throws the entire machine over to the left around the lower bolt 8 as a pivot. This moves the upppermost clamp off the upper edge of the plank 1 (although it might slide along the same) and brings it to a position as far to the left of the lowermost clamp as it is now shown to the right thereof in this view, with the result that the guides 14 and 15 are then inclined in the opposite direction and the action above described can be repeated for cutting the grooves of the treads of the stairs, excepting only that the stop 19 may be moved downward a little lower so that the overhanging edges of the treads will be cut out of the stair-horse as shown. By preference I would provide each machine with a right-hand bit and a left-hand bit of each dimension with which it is supplied. The reason is because where the grooves run out of the upper edge of the string S the latter is apt to be split unless the bit rotates in the proper direction, as well known to every workman in this line, and by the use of my machine it is obviously equally easy to rotate the bit in either direction.

I have spoken above of the screw 56 being preferably hollow, and this is my preferred construction as shown in Fig. 6, although when it is employed the slot 47 may be omitted from the stock 45. But if the screw and its head be hollow or tubular it will be clear that a small steel rod 100 (shown only in Fig. 6) may be passed through said screw and throughout the length of the stock, and the bit or tool driven out when it is to be removed, without the necessity for having the transverse slot 47 in the stock and which requires that the latter be removed from the spindle before the wedge can be used as above described.

What is claimed as new is:

1. In a routing machine, the combination with a work-holder including a plank adapted to be stood on edge and having a bead along its face near its lower edge, clamps adjustably mounted on the edges of said plank, and parallel guides connecting said clamps; of a carriage having eyes slidably and revolubly mounted on one guide and forks fitting over the other guide, spring-actuated latches in said forks engaging the guide, and the routing mechanism proper carried by said carriage.

2. In a routing machine, the combination with a pair of parallel guides, and a stop adjustably mounted on one of them; of a carriage having eyes slidably and revolubly mounted on one guide and two forks fitting over the other guide, spring-actuated latches adjacent the forks for engaging this guide, the routing mechanism proper carried by said carriage, and a handle secured to said carriage for the purpose set forth.

3. In a routing machine, the combination with a work-holder including a plank adapted to be stood on edge; of clamps adjustably engaging the upper and lower edges of said plank and each carrying a metal-faced block, a bolt therethrough, a disk mounted on the facing around said bolt, eyes at opposite sides of the disk, a thumb nut on the bolt for holding the disk in any position, parallel guides connecting the eyes in one disk with those in the other, and the machine proper movably carried on said guides.

4. In a routing machine, the combination with a work-holder including a plank standing on edge and having a groove in its face near its lower edge; of clamps adjustably engaging the upper and lower edges of said plank, a rib in the lower clamp slidably engaging said groove, a block carried by each clamp, a bolt therethrough, a disk mounted on the block and journaled around said bolt, eyes at opposite sides of the disk, a thumb nut on the bolt for setting the disk in any position, parallel guides connecting the eyes in one disk with those in the other, and the machine proper movably mounted on said guides.

5. In a routing machine, the combination with a carriage; of driving and driven spindles journaled in said carriage, the driven spindle having a tubular body with a closed upper end provided with an opening, a stock slidably mounted within this spindle and having a threaded socket in its upper end, means for detachably securing the bit to its lower end, a screw adapted to engage said socket and having a groove around its shank removably engaging said key-hole slot, means for rotating the driving spindle, and a train of gears between the spindles.

6. In a routing machine, the combination with a carriage; of a tubular spindle journaled in said carriage and having a longitudinal groove within its bore and its upper end closed except for an opening, a screw whose shank is swiveled in said opening, a stock mounted in the bore of this spindle and having a key engaging said groove and a threaded socket engaging said screw, means for removably securing the bit in the lower end of said stock, and means for rotating said spindle.

7. In a routing machine, the combination with a pair of tubular guides, and means for holding them in parallelism across the work; of the routing mechanism proper, a carriage in which it is mounted, a pair of eyes on the carriage slidably and revolubly mounted on one guide, a pair of forks on the carriage adapted to engage over the other guide, a rod journaled through the fork-arms and having a thumb-piece, a pair of latches fast on said rod adjacent the forks, and a spring for turning the rod in a direction to throw the latches across the forks, for the purpose set forth.

8. In a machine of the class described, the combination with a tubular spindle having its upper end closed except for a key-hole slot, means for rotating said spindle, and a tubular stock slidably mounted in the latter and having its bore threaded at its upper end and adapted at its lower end for the reception of the bit; of a tubular screw engaged with the threads of the stock and having an annular groove around its head adapted to engage the slot in the upper end of the spindle, for the purpose set forth.

In testimony whereof I have hereunto set my hand in presence of two subscribing witnesses.

SAMUEL HUNTER.

Witnesses:
FREDERICK FORRESTER,
M. B. SMITH.

---

Copies of this patent may be obtained for five cents each, by addressing the "Commissioner of Patents, Washington, D. C."